(12) United States Patent
Miura et al.

(10) Patent No.: US 10,640,067 B2
(45) Date of Patent: May 5, 2020

(54) VEHICULAR IMPACT-ABSORBING MEMBER

(71) Applicants: TOYOTA SHATAI KABUSHIKI KAISHA, Aichi-ken (JP); TOYOTA JIDOSHA KABUSHIKI KAISHA, Aichi-ken (JP)

(72) Inventors: Toshihisa Miura, Kariya (JP); Junichi Takayanagi, Toyota (JP)

(73) Assignees: TOYOTA SHATAI KABUSHIKI KAISHA, Aichi-ken (JP); TOYOTA JIDOSHA KABUSHIKI KAISHA, Aichi-ken (JP)

(*) Notice: Subject to any disclaimer, the term of this patent is extended or adjusted under 35 U.S.C. 154(b) by 23 days.

(21) Appl. No.: 16/173,927

(22) Filed: Oct. 29, 2018

(65) Prior Publication Data
US 2019/0143919 A1    May 16, 2019

(30) Foreign Application Priority Data
Nov. 15, 2017 (JP) .................. 2017-220229

(51) Int. Cl.
*B60R 19/22* (2006.01)
*B60R 19/18* (2006.01)
*B60R 19/42* (2006.01)
*B60R 19/02* (2006.01)

(52) U.S. Cl.
CPC ............ *B60R 19/22* (2013.01); *B60R 19/023* (2013.01); *B60R 19/42* (2013.01); *B60R 2019/1813* (2013.01)

(58) Field of Classification Search
CPC ......... B60R 19/03; B60R 19/18; B60R 19/22; B60R 19/023; B60R 19/42; B60R 2019/1806; B60R 2019/1813; F16F 7/003; F16F 7/02; F16F 7/08
USPC ....... 293/102, 122, 126; 296/187.03, 187.12, 296/191
See application file for complete search history.

(56) References Cited

U.S. PATENT DOCUMENTS

| 3,884,521 | A | * | 5/1975 | Moore | ................... | B60R 19/42 296/203.01 |
| 3,888,531 | A | * | 6/1975 | Straza | ................... | B60R 19/18 293/120 |
| 6,276,105 | B1 | * | 8/2001 | Wycech | ................. | B60J 5/0444 293/120 |

(Continued)

FOREIGN PATENT DOCUMENTS

| JP | 2013-044339 A | 3/2013 |
| JP | 2015-182560 A | 10/2015 |

(Continued)

*Primary Examiner* — Gregory A Blankenship
(74) *Attorney, Agent, or Firm* — Christensen, Fonder, Dardi & Herbert PLLC

(57) ABSTRACT

A vehicular impact-absorbing member may include a wood member having a first pair of opposite surfaces perpendicular to an axis direction of annual rings thereof and a second pair of opposite surfaces parallel to the axis direction of the annual rings thereof, a pair of restraint members respectively positioned on the second pair of opposite surfaces of the wood member, and connecting members connecting the pair of restraint members to each other with the wood member sandwiched between the pair of restraint members.

12 Claims, 5 Drawing Sheets

(56) References Cited

U.S. PATENT DOCUMENTS

| | | | | |
|---|---|---|---|---|
| 6,450,564 B1* | 9/2002 | Sill | ............... | B62D 25/02 |
| | | | | 296/186.1 |
| 2005/0241253 A1* | 11/2005 | Song | ............... | B62D 33/046 |
| | | | | 52/578 |
| 2013/0306419 A1* | 11/2013 | Okuda | ............... | B60R 19/34 |
| | | | | 188/377 |
| 2014/0124315 A1* | 5/2014 | Okuda | ............... | F16F 7/121 |
| | | | | 188/376 |
| 2014/0305757 A1* | 10/2014 | Okuda | ............... | B60R 19/03 |
| | | | | 188/371 |
| 2014/0346789 A1* | 11/2014 | Okuda | ............... | F16F 7/12 |
| | | | | 293/122 |
| 2019/0084512 A1* | 3/2019 | Takayanagi | ............... | B60R 19/03 |
| 2019/0143919 A1* | 5/2019 | Miura | ............... | B60R 19/22 |
| | | | | 293/120 |

FOREIGN PATENT DOCUMENTS

| | | |
|---|---|---|
| JP | 2017-007598 A | 1/2017 |
| JP | 2018-158671 A | 10/2018 |

* cited by examiner

Example

Control

VEHICULAR IMPACT-ABSORBING MEMBER

PRIORITY CLAIM

The present application claims priority to Japanese Patent Application No. 2017-220229 filed on Nov. 15, 2017, which said application is incorporated by reference in its entirety herein.

BACKGROUND

The present disclosure relates to a vehicular impact-absorbing member. More particularly, the present disclosure relates to a vehicular impact-absorbing member that is configured to absorb a load using a deformability of a wood member.

Such a vehicular impact-absorbing member is taught, for example, by JP2013-44339A. The impact-absorbing member taught by JP2013-44339A has a housing and a substantially rectangular parallelepiped core member made of resin or paper. The core member is combined with the housing. The impact-absorbing member is attached to a vehicle such that a (compression) load or impact can be longitudinally applied to the core member at a longitudinal end surface of the core member. When a vehicular collision occurs, the impact-absorbing member (the core member) may be axially compressed and collapsed by the load applied thereto, so that the load may be absorbed.

Also, such a vehicular impact-absorbing member is taught, for example, by JP2017-7598A. The impact-absorbing member taught by JP2017-7598A is composed of a substantially rectangular parallelepiped wood member (timber). The impact-absorbing member is attached to a vehicle such that a (compression) load or impact can be longitudinally applied to the impact-absorbing member at a longitudinal end surface thereof. When the load is applied to the vehicle due to a vehicular collision, the impact-absorbing member may be axially compressed and collapsed by the load applied thereto, so that the load may be absorbed.

The impact-absorbing member (the wood member) is attached to the vehicle while an axis direction of annual rings thereof is aligned with a direction in which the load is applied. In particular, the impact-absorbing member is positioned between a front member (a bumper reinforcement member) and a side member while the axis direction of annual rings thereof is aligned with a front-back direction of the vehicle. The front member is formed as a rectangular tubular member that is positioned in a front end of the vehicle so as to extend in a widthwise or transverse direction of the vehicle. The front member has a through hole formed in a rear wall thereof and configured to receive a front end of the impact-absorbing member. Conversely, the side member is formed as a rectangular tubular member that is positioned in a front lateral side of the vehicle so as to extend in a longitudinal or front-back direction of the vehicle. The side member has a through bore extending therethrough and configured to receive a rear end of the impact-absorbing member. Further, the impact-absorbing member is formed or processed such that the axis direction of annual rings thereof corresponds to a longitudinal direction thereof. The impact-absorbing member is positioned between the front member and the side member while the front and rear ends thereof are respectively inserted into the through hole of the front member and the through bore of the side member. The impact-absorbing member thus positioned is fixed to the front and side members by bolting. Thus, the impact-absorbing member is attached to the vehicle while the axis direction of annual rings thereof is aligned with the front-back direction of the vehicle.

The impact-absorbing member thus attached is not completely covered by the front and side members. That is, the impact-absorbing member is substantially exposed over the entire surfaces (upper, lower and side surfaces) except for the front and rear ends thereof that are respectively connected to the front and side members. When an impact or load is applied to the front member due to the vehicular collision, the impact-absorbing member may be axially compressed and deformed by the load applied thereto via the front member, so as to absorb the impact.

However, an excessively high load may be sometimes applied to the impact-absorbing member. Also, the load may be sometimes excessively quickly applied to the impact-absorbing member. Under such conditions, the impact-absorbing member may be cracked in the axis direction of annual rings thereof (the front-back direction of the vehicle). The cracked impact-absorbing member may be broken before it is sufficiently compressed and deformed. This may lead to reduction in impact absorbing characteristics.

In order to solve the problem, the impact-absorbing member may be increased in size. Alternatively, the impact-absorbing member may be covered by hard covering materials. However, the impact-absorbing member increased in size or covered by the hard covering materials may be prohibited from being smoothly compressed or deformed when the load is applied thereto.

Thus, there is a need in the art to provide an improved vehicular impact-absorbing member.

SUMMARY

In one aspect of the present disclosure, a vehicular impact-absorbing member may include a wood member, a pair of restraint members having a hardness greater than the wood member, and connecting portions connecting the restraint members to each other so as to combine the restraint members with the wood member, and may be configured to absorb an impact load applied to a vehicle using deformability of the wood member. The wood member is positioned such that an axis direction of annual rings thereof is substantially aligned with a direction of the impact load, and has an input end portion to which the impact load is applied and a base end portion positioned opposite to the input end portion. The pair of constraint members are oppositely positioned with the wood member sandwiched therebetween and with covering a portion between the input end portion and the base end portion of the wood member when the impact-absorbing member is viewed from a side facing the input end portion of the wood member. The connecting portions are positioned so as to bridge the pair of restraint members when the impact-absorbing member is viewed from a side facing the input end portion of the wood member, and include a pair of input end-side connecting portions that are positioned relatively adjacent to the input end portion of the wood member and a pair of base end-side connecting portions that are positioned relatively away from the input end portion of the wood member than the input end-side connecting portions. The pair of input end-side connecting portions are spaced in a direction perpendicular to a bridging direction of the connecting portions. The pair of base end-side connecting portions are spaced in the direction perpendicular to the bridging direction of the connecting portions.

According to the impact-absorbing member, the wood member may be restrained by the restraint members that are positioned between the input end portion and the base end portion of the wood member. That is, the wood member may be restrained by the restraint members in a direction perpendicular to the axis direction of annual rings thereof. Therefore, even when the wood member is cracked due to the impact load applied to the impact-absorbing member, the wood member may be effectively prevented from being broken by the restraint members before it is compressed and deformed. Thus, event when an excessively high impact load is applied to the impact-absorbing member, such a high impact load may be effectively absorbed. Further, the restraint members may be partially connected to the wood member via the connecting portions. Therefore, the wood member may be smoothly deformed because the wood member is not excessively restrained by the restraint members.

Other objects, features and advantages of the present disclosure will be readily understood after reading the following detailed description together with the accompanying drawings and the claims.

DETAILED DESCRIPTION

Figure 1:
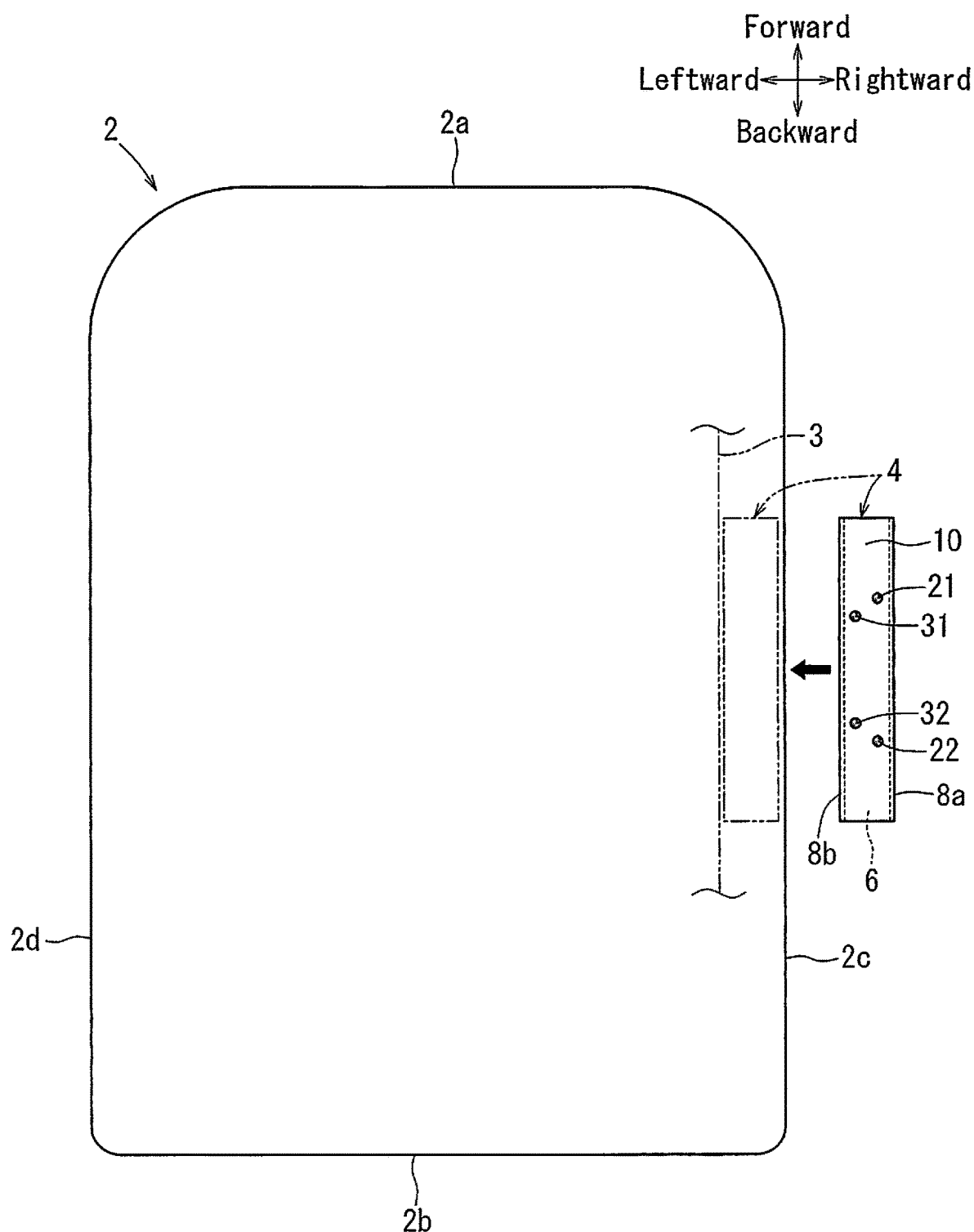
FIG. 1 is a schematic plan view of a vehicle having an impact-absorbing member according to a representative embodiment of the present disclosure, which view shows a condition before the impact-absorbing member is attached to the vehicle.

In the following, an impact-absorbing member according to a representative embodiment of the present disclosure will be described with reference to FIGS. 1 to 10. Further, forward and backward, rightward and leftward, and upward and downward in the drawings may respectively correspond to forward and backward, rightward and leftward, and upward and downward of a vehicle to which the impact-absorbing member is attached or the impact-absorbing member. Further, a longitudinal (front-back) direction, a vertical direction and a lateral direction in the description may respectively referred to as a longitudinal (front-back) direction, a vertical direction and a lateral direction of the vehicle or the impact-absorbing member.

Outline of Impact-Absorbing Member

As shown in FIG. 1, the present disclosure may be directed to the impact-absorbing member 4 that is intended to be attached to the vehicle 2 such as an automobile in order to absorb an impact load generated in the event of a vehicular collision (e.g., a vehicular lateral collision, a vehicular frontal collision and a vehicular rear collision). As shown in FIG. 1, the impact-absorbing member 4 of the embodiment is intended to be attached to a right side portion 2c of the vehicle 2 in order to absorb the impact load generated in the event of the vehicular lateral collision. Further, the vehicle 2 may have a metal body 3 (only a right side portion extending in a front-back direction of the vehicle 2 is shown in FIG. 1). The impact-absorbing member 4 is configured to be positioned along the right side portion of the body 3. Further, the impact-absorbing member 4 may preferably be attached to the vehicle 2 by various connecting devices. For example, the impact-absorbing member 4 may be attached to the vehicle 2 by bolting at front and rear end portions thereof.

However, an attaching position of the impact-absorbing member 4 may be changed provided that the impact-absorbing member 4 can absorb the impact load caused by the vehicular collision in order to protect passengers, pedestrians or other such person. Therefore, the impact-absorbing member 4 may be attached to a front portion 2a, a rear portion 2b and a left side portion 2d of the vehicle 2. Further, the impact-absorbing member 4 may be positioned on an interior frame of the vehicle 2 as necessary.

Figure 2:
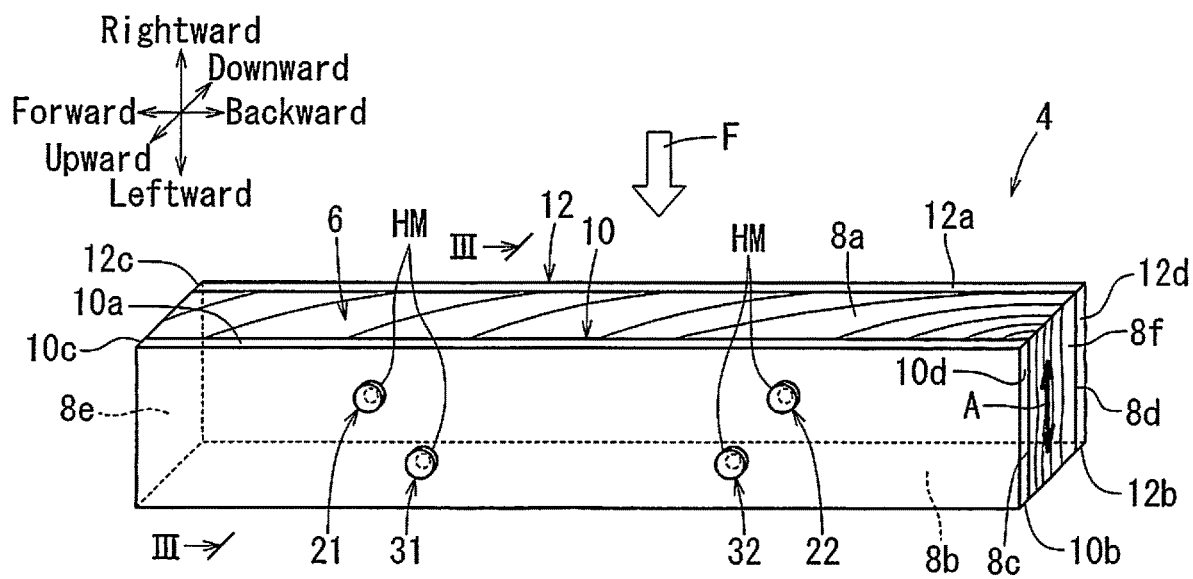
FIG. 2 is a perspective view of the impact-absorbing member attached to the vehicle, in which the vehicle is omitted.
Figure 3:
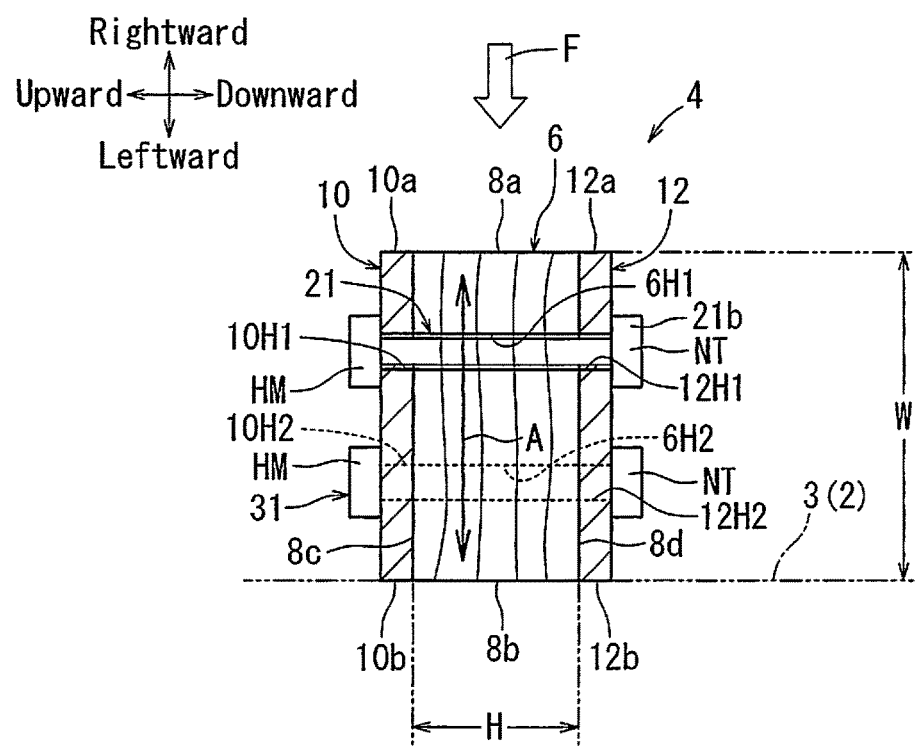
FIG. 3 is a sectional view taken along line III-III of FIG. 2.
Figure 4:
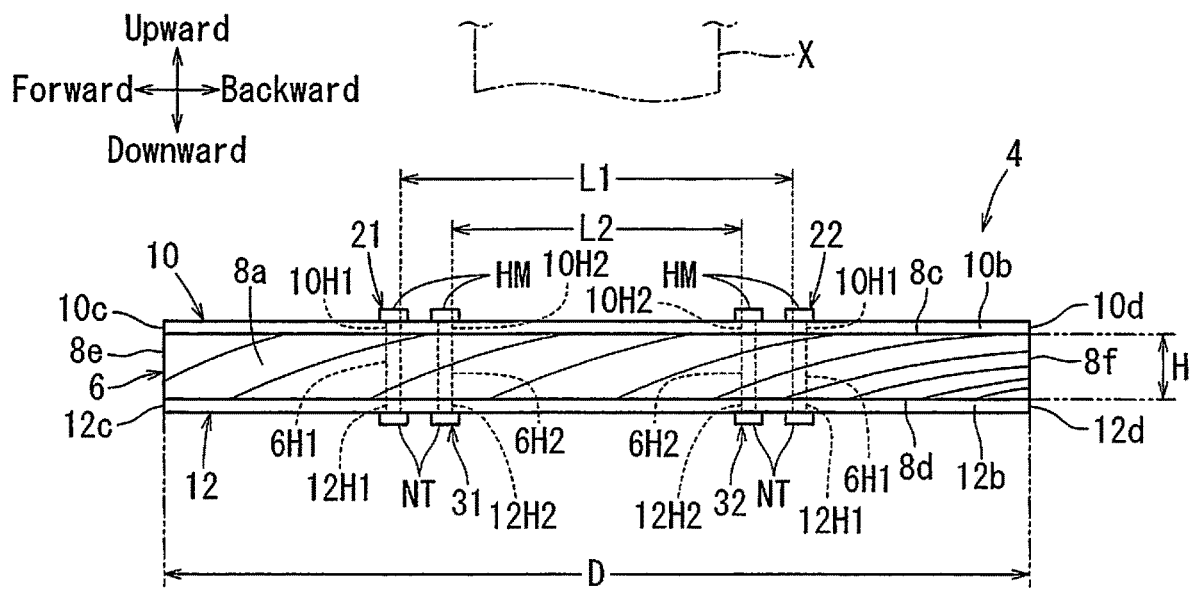
FIG. 4 is an elevational view of the impact-absorbing member attached to the vehicle, in which the vehicle is omitted.

As described above, the impact-absorbing member 4 may be intended to absorb the impact load generated in the event of the vehicular lateral collision. As shown in FIGS. 2 to 4, the impact-absorbing member 4 may be composed of an elongated substantially rectangular parallelepiped-shaped wood member 6 having a length D, a height (thickness) H and a width W, a pair of (upper and lower) substantially rectangular plate-shaped restraint members 10 and 12, and a plurality of (four in this embodiment) connecting members 21, 22, 31 and 32. The wood member 6 may have right and left surfaces 8a and 8b laterally oppositely positioned, upper and lower surfaces 8c and 8d vertically oppositely positioned, and front and rear surfaces 8e and 8f longitudinally oppositely positioned. The restraint members 10 and 12 may respectively have the substantially same shape (profile) and size as the upper and lower surfaces 8c and 8d of the wood member 6. The wood member 6 may integrated with the restraint members 10 and 12 by the connecting members 21, 22, 31 and 32 while the wood member 6 is vertically sandwiched between the upper and lower restraint members 10 and 12. Further, the connecting members 21 and 22 and the connecting members 31 and 32 may respectively be referred to as a first pair of (first front and rear) connecting members 21 and 22 and a second pair of (second front and rear) connecting members 31 and 32. As shown in FIG. 1, the impact-absorbing member 4 thus constructed may be longitudinally attached to the vehicle 2 in the front-back direction of the vehicle 2 with the left surface 8b of the wood member 6 positioned laterally adjacent to the right side portion of the body 3 such that the impact load F generated in the event of the vehicular lateral collision may be applied to the right surface 8a of the wood member 6.

Regarding Wood Member

Figure 5:
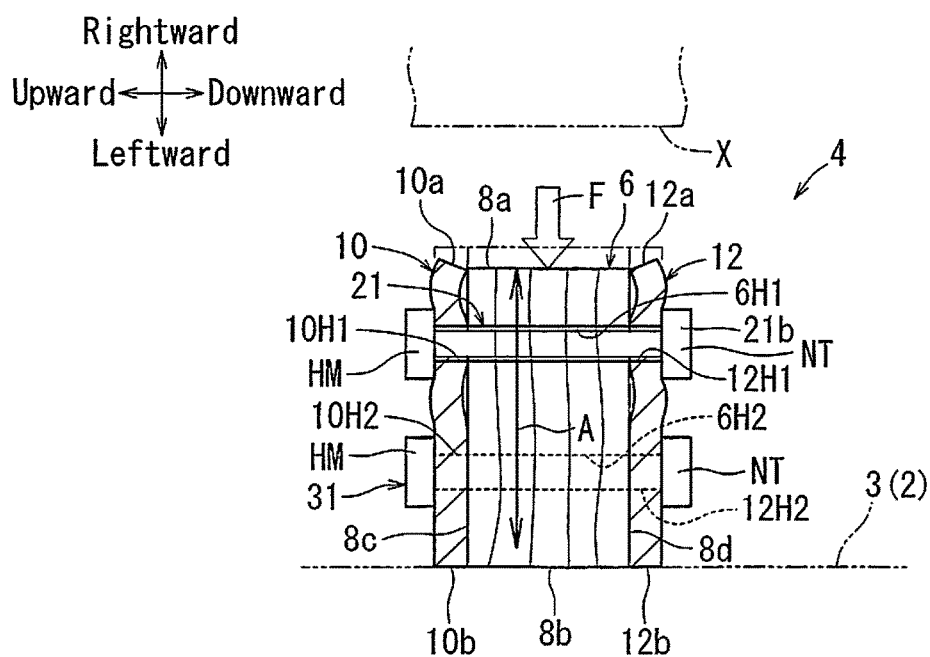
FIG. 5 is a sectional view similar to FIG. 3, which view shows a condition in which a load is laterally applied to the impact-absorbing member.

The wood member 6 may function as a core member of the impact-absorbing member 4. That is, the wood member 6 may be compressed or deformed when the impact load F generated in the event of the vehicular lateral collision is laterally applied thereto. As shown in FIGS. 2, 3 and 5, the wood member 6 may be formed or sawn up to a rectangular parallelepiped shape such that the right and left surfaces 8a and 8b may be perpendicular to an axis direction A of annual rings of the wood member 6 while the upper and lower surfaces 8c and 8d may be parallel to the axis direction A of the annual rings of the wood member 6. In other words, the wood member 6 may be configured such that the axis direction A of the annual rings thereof may extend in a width direction of the wood member 6. Therefore, when the impact load F is laterally applied to the impact-absorbing member 4, the wood member 6 may be compressed and deformed in the axis direction A of the annual rings thereof, so that the applied impact load F can be absorbed (FIG. 5). Further, the right and left surfaces 8a and 8b of the wood member 6 may respectively be referred to as a first pair of (laterally) opposite surfaces perpendicular to the axis direction A of the annual rings of the wood member 6. Conversely, the upper and lower surfaces 8c and 8d of the wood member 6 may respectively be referred to as a second pair of (vertically) opposite surfaces parallel to the axis direction A of the annual rings of the wood member 6.

The type of the wood member 6 is not specially limited. For example, the wood member 6 may be formed by a needle leaf tree such as cedar, Japanese cypress and pine and a broad-leaf tree such as Japanese zelkova and beech. However, the needle leaf tree may be advantageously used because the needle leaf tree may have clear annual rings.

The right and left surfaces 8a and 8b of the wood member 6 may be formed as longitudinally elongated flat outside and inside surfaces. Each of the right and left surfaces 8a and 8b may have a length and a width respectively corresponding to the length D and the height (thickness) H of the wood member 6. The right surface 8a may function as a load applied (input) end portion of the wood member 6 to which the impact load F caused by the vehicular lateral collision is applied. Conversely, the left surface 8b may function as a load bearing (base) end portion of the wood member 6 that is pressed to the body 3 over the entire area thereof when the impact load F is applied to the right surface 8a. Further, the right and left surfaces 8a and 8b of the wood member 6 may respectively be referred to as an input end surface and a base end surface.

The upper and lower surfaces 8c and 8d of the wood member 6 may be formed as longitudinally elongated flat surfaces. Each of the upper and lower surfaces 8c and 8d may have a length and a width respectively corresponding to the length D and the width W of the wood member 6. The upper and lower surfaces 8c and 8d thus formed may respectively function as retainer portions on which the upper and lower restraint members 10 and 12 are positioned. Further, the front and rear surfaces 8e and 8f of the wood member 6 may be formed as flat end surfaces. Each of the front and rear surfaces 8e and 8f may have a height and a width respectively corresponding to the height (thickness) H and the width W of the wood member 6.

Further, the length, the height (thickness) and the width of the wood member 6 may be appropriately determined in consideration of an expected degree of the impact load F (i.e., a load absorbing properties required for the wood member 6). In other words, each of the dimensions of the upper and lower surfaces 8c and 8d and the front and rear surfaces 8e and 8f may preferably be determined as necessary.

As shown in FIGS. 3 to 4, the wood member 6 may have a plurality of (four in this embodiment) through bores 6H1 and 6H2 into which the first pair of connecting members 21 and 22 and the second pair of connecting members 31 and 32 are respectively inserted. The through bores 6H1 and 6H2 may vertically penetrate the wood member 6 so as to open in the upper and lower surfaces 8c and 8d of the wood member 6. Further, the through bores 6H1 and the through bores 6H2 may respectively be referred to as a first pair of through bores 6H1 and a second pair of through bores 6H2.

Regarding Restraint Members

As shown in FIGS. 2 to 4, the upper and lower restraint members 10 and 12 may be oppositely positioned and connected to each other with the wood member 6 vertically sandwiched therebetween when the impact-absorbing member 4 is viewed from a side facing the right surface 8a (the input end portion) of the wood member 6. The pair of (upper and lower) restraint members 10 and 12 thus positioned may function to vertically restrain the wood member 6. The upper and lower restraint members 10 and 12 may be made of materials having a hardness greater than the wood member 6, e.g., various metallic (alloyed) materials such as an aluminum material, an iron material, a steel material, a stainless material, and fiber reinforced plastic materials such as a fiber-glass reinforced plastic material. However, the metallic materials may be advantageously used due to their excellent strength. Further, the aluminum material may be more advantageously used due to its lightweight properties.

As shown in FIGS. 3 to 4, the upper restraint member 10 may have a plurality of (four in this embodiment) through holes 10H1 and 10H2 into which the first pair of connecting members 21 and 22 and the second pair of connecting members 31 and 32 are respectively inserted. The through holes 10H1 and 10H2 may vertically penetrate the upper restraint member 10 so as to open in upper (outer) and lower (inner) surfaces of the upper restraint member 10. Further, the through holes 10H1 and the through holes 10H2 may respectively be referred to as a first pair of through holes 10H1 and a second pair of through holes 10H2. Similarly, the lower restraint member 12 may have a plurality of (four in this embodiment) through holes 12H1 and 12H2 into which the first pair of connecting members 21 and 22 and the second pair of connecting members 31 and 32 are respectively inserted. The through holes 12H1 and 12H2 may vertically penetrate the lower restraint member 12 so as to open in upper (inner) and lower (outer) surfaces of the lower restraint member 12. Further, the through holes 12H1 and the through holes 12H2 may respectively be referred to as a first pair of through holes 12H1 and a second pair of through holes 12H2. As will be appreciated, the through holes 10H1 and 10H2 and the through holes 12H1 and 12H2 may be formed in the upper and lower restraint members 10 and 12 so as to respectively be vertically aligned with the through bores 6H1 and 6H2 formed in the wood member 6 when the wood member 6 is vertically sandwiched between the upper and lower restraint members 10 and 12 in order to integrate the wood member 6 with the upper and lower restraint members 10 and 12 using the connecting members 21, 22, 31 and 32.

Further, the upper and lower restraint members 10 and 12 may preferably be positioned on the wood member 6 while respectively substantially entirely covering the upper and lower surfaces 8c and 8d of the wood member 6 (i.e., a portion between the right and left surfaces 8a and 8b of the wood member 6). In particular, as shown in FIGS. 2 to 4, the upper restraint member 10 may be positioned on the upper surface 8c of the wood member 6 while right and left end surfaces 10a and 10b and front and rear end surfaces 10c and 10d thereof are respectively vertically flush or aligned with the right and left surfaces 8a and 8b and the front and rear surfaces 8e and 8f of the wood member 6. Similarly, the lower restraint member 12 may be positioned on the lower surface 8d of the wood member 6 while right and left end surfaces 12a and 12b and front and rear end surfaces 12c and 12d thereof are respectively vertically flush or aligned with the right and left surfaces 8a and 8b and the front and rear surfaces 8e and 8f of the wood member 6. Further, the upper and lower restraint members 10 and 12 thus positioned may be substantially identical with or parallel to the axis direction A of the annual rings of the wood member 6. That is, the upper and lower restraint members 10 and 12 thus positioned may substantially be perpendicular to the annual rings of the wood member 6.

Regarding Connecting Members (Connecting Portions)

As shown in FIGS. 2 to 4, the connecting members 21, 22, 31 and 32 (the first pair of connecting members 21 and 22 and the second pair of connecting members 31 and 32) may function to connect the upper and lower restraint members 10 and 12 with interleaving the wood member 6 therebetween. That is, the connecting members 21, 22, 31 and 32 may function to connect the upper and lower restraint members 10 and 12 to each other so as to combine the upper and lower restraint members 10 and 12 with the wood member 6. Further, the connecting members 21, 22, 31 and 32 may be referred to as connecting portions. Further, the first pair of connecting members 21 and 22 and the second pair of connecting members 31 and 32 may respectively be referred to as input end-side (first front and rear) connecting portions and base end-side (second front and rear) connecting portions. The first pair of connecting members 21 and 22 and the second pair of connecting members 31 and 32 may respectively be composed of elongated headed threaded rods each having the same shape and size. In particular, each of the first pair of connecting members 21 and 22 and the second pair of connecting members 31 and 32 may be formed as an elongated shaft having an upper end in which a diametrically enlarged head HM is formed and a lower end which is configured such that a nut NT is attached. Further, the connecting members 21, 22, 31 and 32 may be made of various materials provided that they have predetermined strength. However, the connecting members 21, 22, 31 and 32 may preferably be made of the same material as the restraint members 10 and 12.

The connecting members 21, 22, 31 and 32 may connect the upper and lower restraint members 10 and 12 while the wood member 6 is sandwiched between the upper and lower restraint members 10 and 12 in a vertical direction when the impact-absorbing member 4 is viewed from the side facing the right surface 8a (the input end portion) of the wood member 6. In particular, the connecting members 21, 22, 31 and 32 may vertically bridge the upper and lower restraint members 10 and 12 with penetrating the wood member 6 sandwiched therebetween. As a result, the wood member 6 may be integrated with the restraint members 10 and 12 via the connecting members 21, 22, 31 and 32 with sandwiched therebetween. Thus, the impact-absorbing member 4 may be formed. Further, the vertical direction may be referred to as "a bridging direction of connecting members viewed from an input end portion of a wood member."

Next, an assembling method of the impact-absorbing member 4 will be described in detail. Further, the connecting members 21, 22, 31 and 32 may be used in the same manner as each other. Therefore, the input end-side connecting member 21 will be hereinafter described as a representative of the connecting members 21, 22, 31 and 32.

First, the wood member 6 is vertically sandwiched between the upper and lower restraint members 10 and 12. In particular, the upper and lower restraint members 10 and 12 may be positioned on the wood member 6 while respectively substantially entirely covering the upper and lower surfaces 8c and 8d of the wood member 6. At this time, the through hole 10H1 formed in the upper restraint member 10, the through hole 12H1 formed in the lower restraint member 12, and the through bore 6H1 formed in the wood member 6 may be vertically aligned with each other. Thereafter, the input end-side connecting member 21 may be inserted into the through hole 10H1, the through hole 12H1 and the through bore 6H1 from above until the head HM of the input end-side connecting member 21 (the threaded rod) contacts the upper restraint member 10. Subsequently, the nut NT may be attached to the lower end of the input end-side connecting member 21, so as to fasten the input end-side connecting member 21. The connecting members 22, 31 and 32 may be attached to the upper and lower restraint members 10 and 12 in the same manner as the input end-side connecting member 21. Thus, the wood member 6 may be integrated with the restraint members 10 and 12 via the connecting members 21, 22, 31 and 32, so as to form the impact-absorbing member 4 in which the wood member 6 may be appropriately restraint by the restraint members 10 and 12.

Regarding Input End-Side Connecting Members (Input End-Side Connecting Portions)

As best shown in FIG. 2, the input end-side connecting members 21 and 22 may be arranged in line in a direction perpendicular to the axis direction A of the annual rings of the wood member 6 (i.e., in a longitudinal direction of the impact-absorbing member 4) while they are positioned relatively adjacent to the right surface 8a (the input end portion) of the wood member 6. This means that the through bores 6H1 into which the input end-side connecting members 21 and 22 are respectively inserted may be formed in the wood member 6 so as to be positioned relatively adjacent to the right surface 8a of the wood member 6. Further, as shown in FIG. 4, the input end-side connecting members 21 and 22 may be longitudinally spaced at a distance L1. This means that the through bores 6H1 may be formed in the wood member 6 so as to be longitudinally spaced at the distance L1 in the direction perpendicular to the axis direction A of the annual rings of the wood member 6. Further, the longitudinal direction may be referred to as "a direction perpendicular to a bridging direction of the connecting members when the impact-absorbing member is viewed from a side facing the input end portion of the wood member."

Further, the (longitudinal) distance L1 between the connecting members 21 and 22 may preferably be determined in consideration of dimensions of an impactor X that is expected to hit the vehicle 2 in the event of the vehicular lateral collision. As shown by a chain double-dashed line in FIGS. 4 and 5, the impactor X may be a vertically elongated cylindrical body, e.g., a power pole. In this embodiment, the distance L1 may be determined so as to be greater than a front-back size (diameter) of the impactor X. This configuration is intended to reliably receive the impact load F applied from the impactor X by the wood member 6 in a portion between the connecting members 21 and 22. According to the configuration, the wood member 6 may be smoothly deformed without interfering with the connecting members 21 and 22 when the impact load F is applied to impact-absorbing member 4, so that the impact load F may be effectively absorbed.

Regarding Base End-Side Connecting Members (Base End-Side Connecting Portions)

As best shown in FIG. 2, the base end-side connecting members 31 and 32 may be arranged in line in the direction perpendicular to the axis direction A of the annual rings of the wood member 6 (i.e., in the longitudinal direction of the impact-absorbing member 4) while they are positioned relatively adjacent to the left surface 8*b* (the base end portion) of the wood member 6. In other words, the base end-side connecting members 31 and 32 may be displaced leftward relative to the input end-side connecting members 21 and 22, so as to be positioned relatively away from the input end portion of the wood member 6. This means that the through bores 6H2 into which the base end-side connecting members 31 and 32 are respectively inserted may be formed in the wood member 6 so as to be positioned relatively adjacent to the left surface 8*b* of the wood member 6. Further, as shown in FIG. 4, the base end-side connecting members 31 and 32 may be longitudinally spaced at a distance L2. This means that the through bores 6H2 may be formed in the wood member 6 so as to be longitudinally spaced at the distance L2 in the direction perpendicular to the axis direction A of the annual rings of the wood member 6.

Further, the (longitudinal) distance L2 between the base end-side connecting members 31 and 32 may preferably be determined in consideration of the distance L1 between the input end-side connecting members 21 and 22. Preferably, the distance L2 may be determined so as to be equal to or smaller than the distance L1 between the input end-side connecting members 21 and 22. As shown in FIG. 4, in this embodiment, the distance L2 may be determined so as to be smaller than the distance L1. This configuration permits to relatively securely restrain the wood member 6 along the left surface 8*b*.

Positional Relation between Input End-Side and Base End-Side Connecting Members

As shown in FIG. 4, in this embodiment, the pair of input end-side connecting members 21 and 22 and the pair of base end-side connecting members 31 and 32 may respectively be positioned at the center of the impact-absorbing member 4 in the longitudinal direction (i.e., in the direction perpendicular to the axis direction A of the annual rings of the wood member 6). Therefore, both of the base end-side connecting members 31 and 32 may be positioned between the input end-side connecting members 21 and 22 when the impact-absorbing member 4 is laterally viewed (i.e., viewed from the side facing the right surface 8*a* of the wood member 6). A positional relation between the pair of input end-side connecting members 21 and 22 and the pair of base end-side connecting members 31 and 32 in the longitudinal direction is not limited. That is, the positional relation between the pair of input end-side connecting members 21 and 22 and the pair of base end-side connecting members 31 and 32 in the longitudinal direction may preferably be determined in consideration of a deformation pattern of the wood member 6. Preferably, the pair of input end-side connecting members 21 and 22 and the pair of base end-side connecting members 31 and 32 may respectively be positioned such that at least one of the base end-side connecting members 31 and 32 is positioned between the input end-side connecting members 21 and 22 in the longitudinal direction (i.e., when the impact-absorbing member 4 is laterally viewed).

According such a configuration, when the impact load F is laterally applied to the wood member 6 in the portion between the connecting members 21 and 22, the wood member 6 may be supported by at least one of the base end-side connecting members 31 and 32 along the left surface 8*b* thereof. As a result, the wood member 6 may be appropriately deformed when the impact load F is applied to the impact-absorbing member 4, so that the impact load F may be effectively absorbed.

As shown in FIG. 4, the input end-side connecting members 21 and 22 and the base end-side connecting members 31 and 32 may be positioned in a longitudinally symmetric fashion. However, the input end-side connecting members 21 and 22 and the base end-side connecting members 31 and 32 may be positioned in a longitudinally asymmetric fashion. Further, the pair of input end-side connecting members 21 and 22 and the pair of base end-side connecting members 31 and 32 may respectively be positioned at the longitudinally central portion of the impact-absorbing member 4. However, the input end-side connecting members 21 and 22 and the base end-side connecting members 31 and 32 may respectively be positioned with a shift (offset) relative to the longitudinally central portion of the impact-absorbing member 4. In addition, the pair of input end-side connecting members 21 and 22 and the pair of base end-side connecting members 31 and 32 may respectively be positioned such that both of the base end-side connecting members 31 and 32 are not positioned between the input end-side connecting members 21 and 22 in the longitudinal direction.

Operation of Impact-Absorbing Member

The impact-absorbing member 4 thus constructed may be attached to the vehicle 2 with the left surface 8*b* of the wood member 6 positioned laterally adjacent to the right side portion of the body 3. That is, the impact-absorbing member 4 may be attached to the vehicle 2 such that the impact load F may be laterally applied to the right surface 8*a* of the wood member 6 from the impactor X.

As shown in FIG. 5, when the impact load F acts on the impact-absorbing member 4 from the impactor X due to the vehicular lateral collision, the impact load F may be laterally applied to the right surface 8*a* of the wood member 6. As a result, the wood member 6 may be laterally compressed and deformed in the axis direction A of the annual rings thereof, so that the applied impact load F can be absorbed.

Generally, the excessively high impact load F may sometimes act on the impact-absorbing member 4. Also, the impact load F may be sometimes excessively quickly applied to the impact-absorbing member 4. However, as described above, according to the impact-absorbing member 4, the wood member 6 may be vertically clamped or restrained by the upper and lower restraint members 10 and 12. That is, the wood member 6 may be restrained in parallel to the axis direction A of annual rings thereof by the upper and lower restraint members 10 and 12. Therefore, even when the wood member 6 of the impact-absorbing member 4 may be cracked in the axis direction A of annual rings thereof (the width direction of the wood member 6) due to the impact load F applied to the impact-absorbing member 4, the wood member 6 may be effectively prevented from being broken by the restraint members 10 and 12 before it is sufficiently compressed and deformed. This means that the wood member 6 may be prevented from being reduced in impact absorbing characteristics.

Further, the restraint members 10 and 12 may be partially connected to the wood member 6 by only the connecting members 21, 22, 31 and 32. Therefore, the wood member 6 may be smoothly deformed in the axis direction A of the annual rings thereof without being interrupted by the restraint members 10 and 12.

Further, as shown in FIG. 5, when the wood member 6 is deformed in the axis direction A of the annual rings thereof, the restraint members 10 and 12 may be deformed or crinkled around the connecting members 21, 22, 31 and 32. However, the restraint members 10 and 12 may be connected to each other by the connecting members 21, 22, 31 and 32. Therefore, even when the restraint members 10 and 12 are deformed or crinkled, they are effectively prevented from being separated from the wood member 6. As a result, the wood member 6 may be stably restrained by the restraint members 10 and 12, so as to be effectively prevented from being broken.

The impact-absorbing member 4 is configured to absorb the impact load F by deformability of the wood member 6. Therefore, the impact-absorbing member 4 may have an increased rate of rise of impact-absorption properties relative to an impact-absorbing member that is constructed of metallic materials only. As a result, the impact-absorbing member 4 may absorb a relatively large impact load. This means that the impact-absorbing member 4 may have effective impact-absorption performance. Further, the impact-absorbing member 4 may be relatively downsized because the wood member 6 needs not be increased in size. This may lead to reduction in weight of the vehicle 2 to which the impact-absorbing member 4 is attached.

As shown in FIGS. 2 and 4, in this embodiment, the connecting members 21 and 22 may be longitudinally positioned in line at a relatively large distance (i.e., the distance L1). Therefore, the wood member 6 can easily and reliably receive the impact load F between the connecting members 21 and 22. Further, the wood member 6 may be smoothly deformed without interfering with the connecting members 21 and 22 when the impact load F is applied to the impact-absorbing member 4, so as to effectively absorb the impact load F.

As shown in FIG. 4, the base end-side connecting members 31 and 32 are positioned between the input end-side connecting members 21 and 22 in the longitudinal direction of the impact-absorbing member 4. Therefore, when the impact load F is laterally applied to the wood member 6 in the portion between the connecting members 21 and 22, the wood member 6 may be supported by the base end-side connecting members 31 and 32 along the left surface 8b thereof. As a result, the wood member 6 may be appropriately deformed, so that the impact load F may be effectively absorbed.

Further, the impact-absorbing member 4 may be longitudinally attached to the vehicle 2 with the left surface 8b of the wood member 6 positioned laterally adjacent to the body 3 of the vehicle 2. Therefore, the impact-absorbing member 4 (the wood member 6) may be stably attached to the vehicle 2 without formation of backlash. As a result, the wood member 6 may be appropriately deformed when the impact load F is applied thereto.

[First Modified Form]

Next, an impact-absorbing member 4A according to a first modified form of the representative embodiment will be described with reference to FIG. 6.

The impact-absorbing member 4A may have the same structure as the impact-absorbing member 4 of the representative embodiment provided that the first pair of connecting members 21 and 22 (the input end-side connecting portions) and the second pair of connecting members 31 and 32 (the base end-side connecting portions) are respectively replaced with a first pair of (first front and rear) connecting members 21A and 22A and a second pair of (second front and rear) connecting members 31A and 32A, which may respectively be referred to as (first front and rear) input end-side connecting portions and (second front and rear) base end-side connecting portions. Therefore, portions that are the same as the impact-absorbing member 40 of the representative embodiment will be identified by the same reference numerals and a description thereof may be omitted. Further, unlike the representative embodiment, the wood member 6 does not have the through bores 6H1 and 6H2. Further, the upper restraint member 10 does not have the through holes 10H1 and 10H2. Similarly, the lower restraint member 12 does not have the through holes 12H1 and 12H2.

The connecting member 21A may be formed as an angled plate-shaped member having bent end portions 21a and 21b. The bent end portions 21a and 21b may respectively be formed in opposite ends of the connecting member 21A such that the connecting member 21A may have a substantially U-shape as a whole. Similarly, the connecting member 22A may be formed as a plate-shaped member having bent end portions 22a and 22b that are respectively formed in the same manner as the bent end portions 21a and 21b. Each of the connecting members 21A and 22A may be configured to vertically bridge the upper and lower restraint members 10 and 12 along the right surface 8a of the wood member 6 that is sandwiched between the restraint members 10 and 12. In other words, each of the connecting members 21A and 22A may be configured to vertically clamp (connect) the upper and lower restraint members 10 and 12 between which the wood member 6 is sandwiched.

Similar to the connecting member 21A, the connecting member 31A may be formed as an angled plate-shaped member having bent end portions 31a and 31b. The bent end portions 31a and 31b may respectively be formed in opposite ends of the connecting member 31A such that the connecting member 31A may have a substantially U-shape as a whole. Similarly, the connecting member 32A may be formed as an angled plate-shaped member having bent end portions 32a and 32b that are respectively formed in the same manner as the bent end portions 31a and 31b. Each of the connecting members 31A and 32A may be configured to vertically bridge the upper and lower restraint members 10 and 12 along the left surface 8b of the wood member 6 that is sandwiched between the restraint members 10 and 12. In other words, each of the connecting members 31A and 32A may be configured to vertically clamp (connect) the upper and lower restraint members 10 and 12 between which the wood member 6 is sandwiched.

In order to assemble the impact-absorbing member 4A, the wood member 6 is vertically sandwiched between the upper and lower restraint members 10 and 12 in the same manner as the representative embodiment. Thereafter, the connecting member 21A may be positioned along the right surface 8a of the wood member 6 while the bent end portions 21a and 21b thereof respectively contact the upper and lower restraint members 10 and 12, so as to vertically clamp the upper and lower restraint members 10 and 12 between which the wood member 6 is interleaved. Preferably, the bent end portions 21a and 21b of the connecting member 21A may respectively be secured to the upper and lower restraint members 10 and 12 by welding. Similarly, the connecting member 22A may be positioned along the right surface 8a of the wood member 6 while the bent end portions 22a and 22b thereof respectively contact the upper and lower restraint members 10 and 12, so as to vertically clamp the upper and lower restraint members 10 and 12 between which the wood member 6 is interleaved. Preferably, the bent end portions 22a and 22b of the connecting member 22A may respectively be secured to the upper and lower restraint members 10 and 12 by welding. Further, the connecting members 21A and 22A may be longitudinally spaced at a distance along the right surface 8a of the wood member 6.

Subsequently, the connecting member 31A may be positioned along the left surface 8b of the wood member 6 while the bent end portions 31a and 31b thereof respectively contact the upper and lower restraint members 10 and 12, so as to vertically clamp the upper and lower restraint members 10 and 12 between which the wood member 6 is interleaved. Preferably, the bent end portions 31a and 31b of the connecting member 31A may respectively be secured to the upper and lower restraint members 10 and 12 by welding. Similarly, the connecting member 32A may be positioned along the left surface 8b of the wood member 6 while the bent end portions 32a and 32b thereof respectively contact the upper and lower restraint members 10 and 12, so as to vertically clamp the upper and lower restraint members 10 and 12 between which the wood member 6 is interleaved. Preferably, the bent end portions 32a and 32b of the connecting member 32A may respectively be secured to the upper and lower restraint members 10 and 12 by welding. Further, the connecting members 31A and 32A may be longitudinally spaced at a distance along the left surface 8b of the wood member 6.

Thus, the wood member 6 may be integrated with the restraint members 10 and 12 via the connecting members 21A, 22A, 31A and 32A, so as to form the impact-absorbing member 4A in which the wood member 6 may be appropriately restraint by the restraint members 10 and 12. The impact-absorbing member 4A thus formed may be attached to the vehicle 2 in the same manner as the impact-absorbing member 4 of the representative embodiment.

According to the configuration, similar to the representative embodiment, when the impact load F is laterally applied to the impact-absorbing member 4A, the wood member 6 may be smoothly deformed without interfering with the connecting members 21A, 22A, 31A and 32A, so that the impact load F may be effectively absorbed. Further, according to the configuration, there is no need to bore the wood member 6 and the restraint members 10 and 12. Therefore, the wood member 6 may be prevented from being reduced in rigidity. Further, an assembling work of the impact-absorbing member 4A may be simplified.

Figure 6:
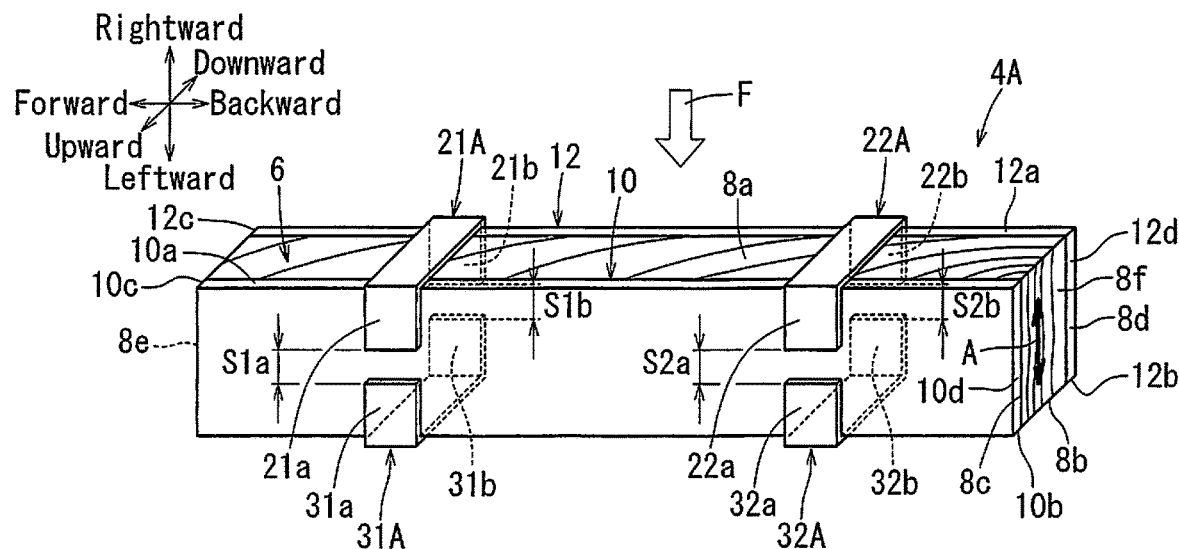
FIG. 6 is a perspective view of an impact-absorbing member according to a first modified form of the embodiment attached to the vehicle, in which the vehicle is omitted.

As shown in FIG. 6, in the first modified form, the connecting members 31A and 32A may be longitudinally positioned at the same distance as the connecting members 21A and 22A. Further, the connecting members 31A and 32A may be positioned so as to be laterally aligned with or opposite to the connecting members 21A and 22A. However, the connecting members 31A and 32A may be longitudinally positioned at a distance different from the connecting members 21A and 22A. Further, the connecting members 31A and 32A may be longitudinally positioned in various positional relations with respect to the connecting members 21A and 22A.

Further, as shown in FIG. 6, in the first modified form, the connecting members 21A and 31A may be configured such that clearances S1a and S1b may respectively be formed between the bent end portions 21a and 21b of the connecting members 21A and the bent end portions 31a and 31b of the connecting members 31A when the connecting members 21A and 31A are attached to the upper and lower restraint members 10 and 12 between which the wood member 6 is interleaved. Similarly, the connecting members 22A and 32A may be configured such that clearances S2a and S2b may respectively be formed between the bent end portions 22a and 22b of the connecting members 22A and the bent end portions 32a and 32b of the connecting members 32A when the connecting members 22A and 32A are attached to the upper and lower restraint members 10 and 12 between which the wood member 6 is interleaved.

[Second Modified Form]

Figure 7:
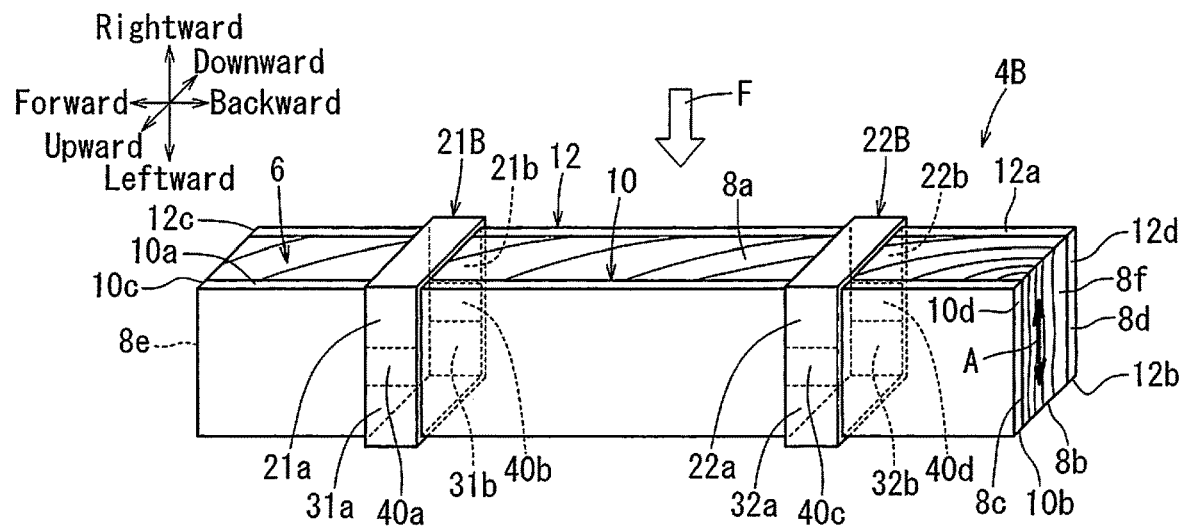
FIG. 7 is a perspective view of an impact-absorbing member according to a second modified form of the embodiment attached to the vehicle, in which the vehicle is omitted.

Next, an impact-absorbing member 4B according to a second modified form of the representative embodiment will be described with reference to FIG. 7.

The impact-absorbing member 4B may have a structure similar to the impact-absorbing member 4A of the first modified form. Therefore, portions that are the same as the impact-absorbing member 40A of the first modified form will be identified by the same reference numerals and a description thereof may be omitted.

In the modified form, the first front connecting member 21A (the front input end-side connecting portion) and the second front connecting member 31A (the front base end-side connecting portion) of the first modified form may be replaced with a single (front) connecting member 21B, which may be referred to as a front combined (input and base end-side) connecting portion. As shown in FIG. 7, the bent end portions 21a and 21b of the connecting members 21A and the bent end portions 31a and 31b of the connecting members 31A may respectively be connected to each other via connecting strips 40a and 40b, so that the clearances S1a and S1b formed therebetween may be bridged or filled. Thus, the connecting members 21A and the connecting members 31A may be laterally integrated with each other, so as to form the connecting member 21B. That is, the connecting member 21B may be formed as a rectangular frame-shaped member that is configured to circumferentially clamp or encircle the upper and lower restraint members 10 and 12 between which the wood member 6 is interleaved. The front connecting member 21B thus formed may have the substantially same function as the first front connecting member 21A (the front input end-side connecting portion) and the second front connecting member 31A (the front base end-side connecting portion) of the first modified form.

Conversely, the first rear connecting member 22A (the rear input end-side connecting portions) and the second rear connecting member 32A (the rear base end-side connecting portions) of the first modified form may be replaced with a single (rear) connecting member 22B, which may be referred to as a rear combined (input and base end-side) connecting portion. As shown in FIG. 7, the bent end portions 22a and 22b of the connecting members 22A and the bent end portions 32a and 32b of the connecting members 32A may respectively be connected to each other via connecting strips 40c and 40d, so that the clearances S2a and S2b formed therebetween may be bridged or filled. Thus, the connecting members 22A and the connecting members 32A may be laterally integrated with each other, so as to form the connecting member 22B. That is, the connecting member 22B may be formed as a rectangular frame-shaped member that is configured to circumferentially clamp or encircle the upper and lower restraint members 10 and 12 between which the wood member 6 is interleaved. The rear connecting member 22B thus formed may have the substantially same function as the first rear connecting member 22A (the rear input end-side connecting portion) and the second rear connecting member 32A (the rear base end-side connecting portion) of the first modified form.

According to the configuration, similar to the first modified form, when the impact load F is laterally applied to the impact-absorbing member 4B, the wood member 6 may be smoothly deformed, so that the impact load F may be effectively absorbed. Further, according to the configuration, there is no need to bore the wood member 6 and the restraint members 10 and 12 similar to the first modified form. Therefore, the wood member 6 may be prevented from being reduced in rigidity. Further, an assembling work of the impact-absorbing member 4B may be simplified.

EXAMPLES

Examples of the impact-absorbing member 4 of the representative embodiment will now be described. Further, the following examples are illustrative and should not be construed as limitations of the disclosure.

Drop Impact Test

A drop impact test was intended to determine innate impact-absorbing performance of the impact-absorbing member 4. In order to form the impact-absorbing member 4, a square cedar bonded wood member having a rectangular parallelepiped shape (40 mm:thickness×200 mm:width×750 mm:length) was prepared as the wood member 6. The wood member 6 was sawn up such that the axis direction A of the annual rings thereof may extend in the width direction of the wood member 6. Further, a pair of an aluminum (A5052) plate-shaped members (3.0 mm:thickness) was prepared as the upper and lower restraint members 10 and 12. Further, four bolts (M10) were used as the connecting members 21, 22, 31 and 32. The distance L1 between the input end-side connecting members 21 and 22 and the distance L2 between the base end-side connecting members 31 and 32 were respectively set to 300 mm and 200 mm.

A control (comparative impact-absorbing member) of the impact-absorbing member 4 was formed using the wood member 6 and the restraint members 10 and 12 in the same manner as the impact-absorbing member 4 except that the connecting members 21, 22, 31 and 32 (i.e., the bolts) were omitted. Further, the restraint members 10 and 12 were combined with the wood member 6 by appropriate fixture members (not shown) instead of the connecting members 21, 22, 31 and 32.

Figure 8:
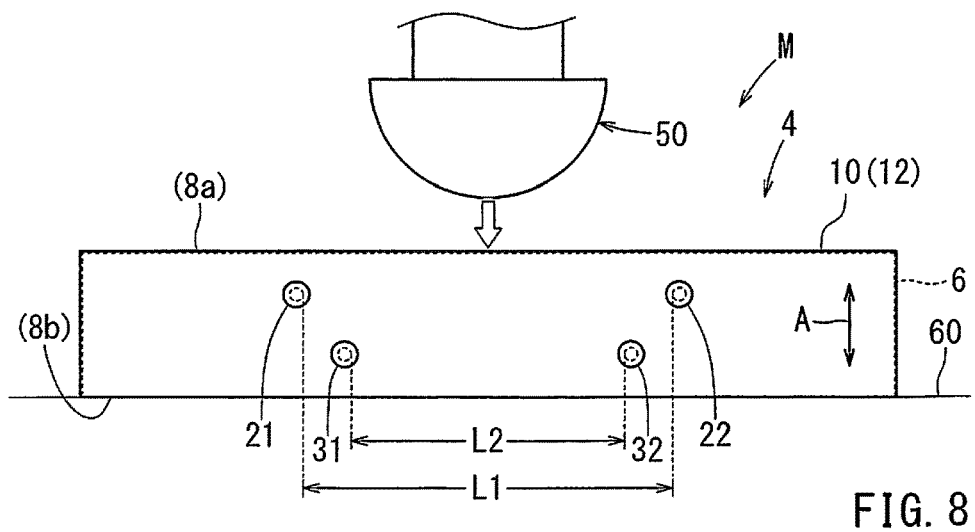
FIG. 8 is a schematic view of a drop impact testing machine on which the impact-absorbing member is put.
Figure 9:
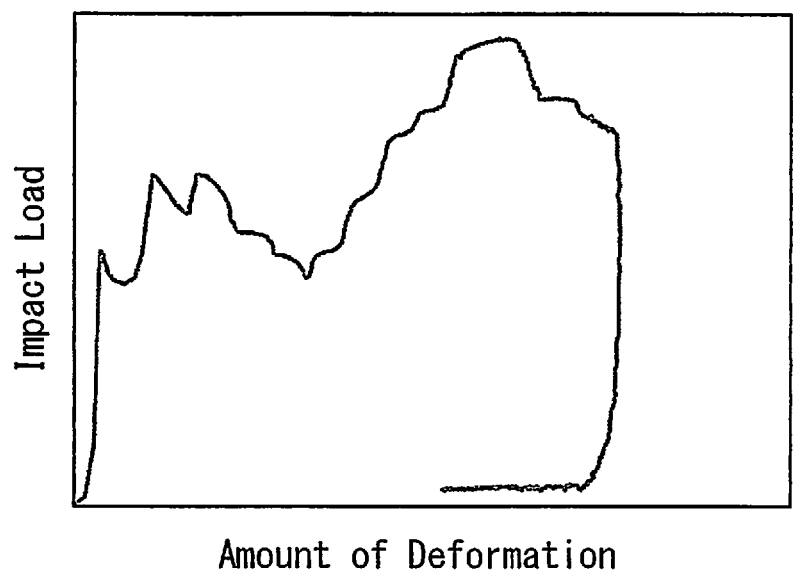
FIG. 9 is a graph illustrating a relationship between a displacement or amount of deformation and a load with regard to the impact-absorbing member according to the representative embodiment, which is obtained from a drop impact test.

As shown in FIG. 8, in order to perform the drop impact test, the impact-absorbing member 4 was set on a test bench 60 of a drop impact testing machine M in a condition in which the input end portion (the input end surface 8a) of the wood member 6 faces an impactor 50 having a semicircular columnar shape. In this condition, the impactor 50 was dropped on or hit against the impact-absorbing member 4 between the input end-side connecting members 21 and 22, so as to apply an impact load to the wood member 6. At this time, the impact load applied to the impact-absorbing member 4 was detected by a load detector (not shown) attached to the test bench 60 while an amount of deformation of the impact-absorbing member 4 was measured. Results are shown in FIG. 9.

Figure 10:
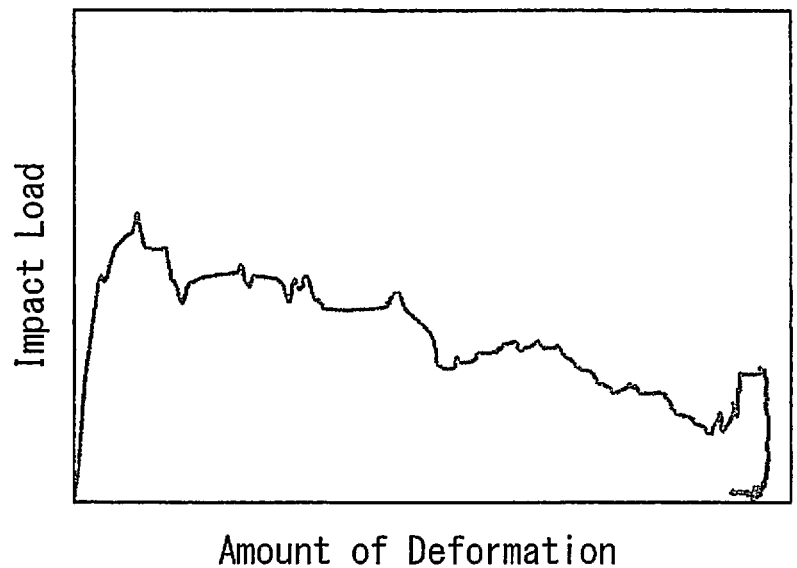
FIG. 10 is a graph illustrating a relationship between a displacement or amount of deformation and a load with regard to a control of the impact-absorbing member, which is obtained from the impact-absorption test.

Thereafter, with regard to the control, the drop impact test was performed in the same manner as the impact-absorbing member 4. Results are shown in FIG. 10. Further, a graph shown in FIG. 10 is identical to a graph shown in FIG. 9 in scale of a vertical axis and a horizontal axis.

Results and Evaluation

According to the impact-absorbing member 4, when the impactor 50 was hit against the wood member 6 of the impact-absorbing member 4, the wood member 6 was not broken before it is compressed and deformed. Further, FIG. 9 demonstrates that the impact load applied to the wood member 6 was effectively absorbed. It is considered that in the impact-absorbing member 4, the wood member 6 may be effectively restrained by the restraint members 10 and 12, so as to be smoothly deformed when the impact load is applied thereto.

To the contrary, in the control of the impact-absorbing member 4, when the impactor 50 was hit against the wood member 6, the wood member 6 was broken before it is compressed and deformed. Further, as shown in FIG. 10, the impact load applied to the wood member 6 was not sufficiently absorbed. It is considered that the restraint members 10 and 12 were spaced from the wood member 6 immediately after the impact load is applied thereto, so that the wood member 6 was cracked before it is compressed and deformed.

[Modified Forms]

The present disclosure is not limited to the embodiment described above and can be changed or modified without departing from the scope of the present disclosure. For example, in the embodiment, the bolts 21, 22, 31 and 32, the angled plate-shaped members 21A, 22A, 31A and 32A and the frame-shaped members 21B and 22B may be used as the connecting portions. However, rivets, clips or other such members may be used as the connecting portions. Further, the rivets, the clips or other such members may be may be secured to the restraint members 10 and 12 by welding or other such methods as necessary. Further, the connecting portions may be studs that are previously formed in one of the restraint members 10 and 12 and are configured to be connected to the other of the restraint members 10 and 12 by welding or other such fastening methods.

In the embodiment, the distance L2 between the base end-side connecting members 31 and 32 may be set to be smaller than the distance L1 between the input end-side connecting members 21 and 22. However, the distance L2 may be set to be greater than the distance L1 as necessary. Further, additional connecting portions other than the input end-side connecting portions and the base end-side connecting portions may be provided as necessary.

In the first modified form, the first and second pairs of connecting members 21A and 22A and 31A and 32A are independent from each other. However, the first pair of connecting members 21A and 22A and the second pair of connecting members 31A and 32A may be connected to each other via additional connecting plates. Similarly, the front and rear connecting members 21B and 22B in the second modified form may be connected to each other via additional connecting plates.

Further, the wood member 6 and the restraint members 10 and 12 may respectively changed in shape and size. Further, the restraint members 10 and 12 may be configured to overhang the front and rear surfaces 8e and 8f of the wood member 6.

The impact-absorbing member 4 of the embodiment may be attached to the front portion 2a of the vehicle 2 (e.g., a portion between a front member and a side member) in order to indirectly absorb the impact load generated in the event of the vehicular lateral collision. Further, the impact-absorbing member 4 may be attached to the vehicle 2 while at least one of the base end portion of the wood member 6 contacts the body 3. Conversely, the impact-absorbing member 4 may be attached to the vehicle 2 while the base end portion of the wood member 6 is spaced from the body 3.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A vehicular impact-absorbing member comprising a wood member, a pair of restraint members having a hardness greater than the wood member, and connecting portions connecting the restraint members to each other so as to combine the restraint members with the wood member, and configured to absorb an impact load applied to a vehicle using deformability of the wood member,
wherein the wood member is positioned such that an axis direction of annual rings thereof is substantially aligned with a direction of the impact load, and has an input end portion to which the impact load is applied and a base end portion positioned opposite to the input end portion,
wherein the pair of constraint members are oppositely positioned with the wood member sandwiched therebetween and with covering a portion between the input end portion and the base end portion of the wood member when the impact-absorbing member is viewed from a side facing the input end portion of the wood member, and are positioned,
wherein the connecting portions are positioned so as to bridge the pair of restraint members when the impact-absorbing member is viewed from the side facing the input end portion of the wood member, and include a pair of input end-side connecting portions that are positioned relatively adjacent to the input end portion of the wood member and a pair of base end-side connecting portions that are positioned relatively away from the input end portion of the wood member than the input end-side connecting portions,
wherein the pair of input end-side connecting portions are spaced in a direction perpendicular to a bridging direction of the connecting portions, and
wherein the pair of base end-side connecting portions are spaced in the direction perpendicular to the bridging direction of the connecting portions.

2. The vehicular impact-absorbing member as defined in claim 1, wherein a distance between the pair of input end-side connecting portions is greater than a distance between the pair of base end-side connecting portions.

3. The vehicular impact-absorbing member as defined in claim 1, wherein at least one of the pair of base end-side connecting portions is positioned between the pair of input end-side connecting portions when the impact-absorbing member is viewed from the side facing the input end portion of the wood member.

4. The vehicular impact-absorbing member as defined in claim 1, wherein the pair of input end-side connecting portions and the pair of base end-side connecting portions bridge the pair of restraint members while penetrating the wood member sandwiched therebetween.

5. The vehicular impact-absorbing member as defined in claim 1, wherein when the impact-absorbing member is attached to the vehicle, the base end portion of the wood member at least partly contacts a body of the vehicle.

6. The vehicular impact-absorbing member as defined in claim 1, wherein the pair of restraint members are made of metallic materials.

7. A vehicular impact-absorbing member, comprising:
a wood member having a first pair of opposite surfaces perpendicular to an axis direction of annual rings thereof, a second pair of opposite surfaces parallel to the axis direction of the annual rings thereof, and a third pair of opposite surfaces parallel to the axis direction of the annual rings thereof;
a pair of restraint members respectively positioned on the second pair of opposite surfaces of the wood member; and
connecting members connecting the pair of restraint members to each other with the wood member sandwiched between the pair of restraint members,
wherein the connecting members are configured to connect the pair of restraint members to each other with the third pair of opposite surfaces of the wood member exposed.

8. The vehicular impact-absorbing member as defined in claim 7, wherein the connecting members comprise threaded rods that are configured to connect the pair of restraint members with penetrating the wood member.

9. The vehicular impact-absorbing member as defined in claim 7, wherein the connecting members comprise angled clamp members that are configured to clamp the pair of restraint members.

10. The vehicular impact-absorbing member as defined in claim 7, wherein the connecting members comprise frame-shaped members that are configured to encircle the pair of restraint members.

11. The vehicular impact-absorbing member as defined in claim 7, wherein the connecting members include a first pair of connecting members that are positioned along one of the first pair of opposite surfaces of the wood member with spaced at a distance and a second pair of connecting members that are positioned along the other of the first pair of opposite surfaces of the wood member with spaced at a distance.

12. The vehicular impact-absorbing member as defined in claim 11, wherein the distance between the first pair of connecting members is greater than the distance between the second pair of connecting members.

* * * * *